United States Patent
Kato et al.

(10) Patent No.: US 7,244,296 B2
(45) Date of Patent: Jul. 17, 2007

(54) WATER BASED INK SET FOR INK-JET RECORDING AND INKJET RECORDING METHOD

(75) Inventors: Ryuji Kato, Aisai (JP); Noriatsu Aoi, Ichinomiya (JP); Narumi Kawai, Nagoya (JP); Tomoyo Hamajima, Nagoya (JP); Masaya Fujioka, Nagoya (JP); Narumi Koga, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 146 days.

(21) Appl. No.: 11/254,901

(22) Filed: Oct. 19, 2005

(65) Prior Publication Data

US 2006/0082629 A1 Apr. 20, 2006

(30) Foreign Application Priority Data

| Oct. 20, 2004 | (JP) | ............................ 2004-305451 |
| Mar. 29, 2005 | (JP) | ............................ 2005-096499 |
| Mar. 29, 2005 | (JP) | ............................ 2005-096567 |

(51) Int. Cl.
*C09D 11/02* (2006.01)
*B41J 2/01* (2006.01)

(52) U.S. Cl. .................... 106/31.27; 106/31.6; 347/100

(58) Field of Classification Search ............. 106/31.27, 106/31.28, 31.6; 347/100
See application file for complete search history.

(56) References Cited

U.S. PATENT DOCUMENTS

| 5,609,671 A | 3/1997 | Nagasawa |
| 5,837,045 A | 11/1998 | Johnson et al. |
| 6,843,840 B2 * | 1/2005 | Kataoka et al. ............. 106/31.6 |
| 7,159,976 B2 * | 1/2007 | Kawamura et al. ...... 106/31.13 |
| 2003/0116055 A1 * | 6/2003 | Kubota et al. ............ 106/31.27 |
| 2005/0041082 A1 * | 2/2005 | Kataoka ...................... 347/100 |
| 2005/0243126 A1 * | 11/2005 | Takahashi et al. ............. 347/40 |
| 2006/0017759 A1 * | 1/2006 | Matsuzawa et al. ........... 347/15 |
| 2006/0017760 A1 * | 1/2006 | Matsuzawa et al. ........... 347/15 |
| 2006/0017761 A1 * | 1/2006 | Matsuzawa et al. ........... 347/15 |
| 2006/0017767 A1 * | 1/2006 | Matsuzawa et al. ........... 347/21 |
| 2006/0082630 A1 * | 4/2006 | Kato et al. ................ 106/31.27 |
| 2006/0109323 A1 * | 5/2006 | Pallen et al. .............. 106/31.27 |

FOREIGN PATENT DOCUMENTS

| JP | H8-3498 | | 1/1996 |
| JP | 09/025442 | * | 1/1997 |
| JP | 2000-513396 | | 10/2000 |
| JP | 2001-354886 | | 12/2001 |
| JP | 2002241661 | | 8/2002 |

OTHER PUBLICATIONS

English translation of JP09/025442, Jan. 1997.*
English translation of JP2001/354886, Dec. 2001.*
English translation of JP2002/241661, Aug. 2002.*

* cited by examiner

*Primary Examiner*—Helene Klemanski
(74) *Attorney, Agent, or Firm*—Reed Smith LLP

(57) ABSTRACT

A water based ink set for ink-jet recording includes a yellow ink, a magenta ink, a cyan ink, a black ink, and a red ink and/or a blue ink each including at least a coloring agent, water and a water soluble organic solvent. In the water based ink set, a water soluble dye is employed as the coloring agent of each of the yellow ink, the magenta ink and the cyan ink, and a pigment is employed as the coloring agent of each of the black ink and the red ink and/or the blue ink. In an ink-jet recording method employing the water based ink set for ink-jet recording, the red ink and the magenta ink are employed together for a magenta-ink-recording portion, and the blue ink and the cyan ink are employed together for a cyan-ink-recording portion.

26 Claims, No Drawings

WATER BASED INK SET FOR INK-JET RECORDING AND INKJET RECORDING METHOD

BACKGROUND OF THE INVENTION

1. Field of the Invention

The present invention relates to a water based ink set for ink-jet recording and to an ink-jet recording method.

2. Related Art of the Invention

An ink-jet recording system has been widely used for color-printing digital color image data. In such an ink-jet recording system, a water based ink set for ink-jet recording has been employed as ink-jet inks. The water based ink set comprises a yellow ink, a magenta ink and a cyan ink which are each prepared by dissolving a water soluble dye into a mixed solvent of water and water soluble organic solvents. In some cases, in order to print text data such as alphabet character data and Chinese character data, a dye based black ink is added to the water based ink set for ink-jet recording. Further, in order to implement vivid color reproducibility, it has been proposed to constitute an ink set with seven water soluble dye based color inks including a yellow ink, a magenta ink, a cyan ink, a red ink, a green ink, a blue ink and a black ink (see Japanese Patent Application Laid-Open No. 2002-241661).

When employing such an ink set, however, the number of nozzles of an ink-jet head must be increased, resulting in the problem of cost increase.

Also, when an ink set is composed of dye based inks only, there is a problem that feathering is noticeable in text. Feathering is fine scale blurring caused by the presence of fibers and spaces in a recording material such as recording paper when ink lands on the recording material to penetrate thereinto.

Recently, in addition to vivid color reproducibility, sharp text print quality has been desired in which blurring such as feathering is suppressed as much as possible. Print quality close to photo image quality has also been desired in which excellent lightfastness and ozone resistance are implemented.

In order to implement sharp text printing, Japanese Patent Publication Laid-Open No. 2001-354886 discloses an ink set for ink-jet recording comprising, in addition to the three primary color inks (yellow, magenta and cyan inks), three additional color inks (black, red and green inks), all of which are composed of pigment based inks.

However, when all of the inks of the ink set are composed of pigment based inks, despite that the additional black, red and green inks are employed together, the color reproducibility is not satisfactory as compared to that of an ink set composed of dye based three primary color inks.

Therefore, in order to implement both sharp print quality without feathering in text and vivid color reproducibility close to silver halide photograph in a color image, a commercially available ink set employs a pigment as a coloring agent for a black ink in which the print quality of text is of importance and employs water soluble dyes as coloring agents for color inks (including yellow ink, magenta ink and cyan ink) in which color reproducibility is of importance.

However, when text is printed by use of an ink set having the abovementioned ink configuration, problems have arisen in text printed in red and in blue, since red color and blue color besides black color are frequently used for emphasis, correction and the like in the actual text.

That is, the red color is expressed by superposing the dye based yellow ink and the dye based magenta ink, and the blue color is expressed by superposing the dye based magenta ink and the dye based cyan ink. Because of this, ink misplacement caused by a landing error of the superposition occurs in each of the text printed in red and in blue to cause the sharpness of the text to deteriorate. In addition, since two kinds of the dye based inks are employed for expressing the red color and the blue color as described above, the amount of the inks employed for expressing each of the colors is about twice as much as the amount of-the black pigment ink employed for printing text in black, thereby causing a problem that feathering tends to occur.

In addition, the text printed in red or in blue also has problems of low water resistance, low lightfastness and low ozone resistance. More specifically, when the water resistance of the inks is low, for example, blurring of a text document printed in an office is likely to occur due to sweat of a human hand or water such as a water drop from a drink, and also migration (i.e., blurring caused by moisture) tends to occur.

When the lightfastness is low, the fading of the red color and the blue color of the text posted for a long period of time occurs due to exposure to illumination light or sunlight, causing the text to have a short shelf life. Particularly, the lightfastness of the dye based magenta ink, which is employed to express the red color together with the dye based yellow ink, is lower than those of the yellow ink, the cyan ink and the black ink. Therefore, the color balance of the image will be disrupted after the color fading, causing the redness of the image to degrade.

Moreover, color fading of an image caused by various gases present in air (particularly by ozone) has recently been paid attention, and thus high ozone resistance has been required. However, the ozone resistance of the magenta ink employed for expressing red color and the cyan ink employed for expressing blue color is lower than those of the yellow ink and the black ink. Therefore, the color balance will be disrupted after the color fading due to aging, causing the redness and the blueness of the image to be degraded. Consequently, yellow color will mainly remain on a recording material after the fading of the magenta ink and the cyan ink due to aging, causing the yellowness of the image to be enhanced. Such disruption of the color balance after the color fading due to aging gives an unnatural impression, and this has been a serious problem in improving print quality.

SUMMARY OF THE INVENTION

The present invention has been made to solve the above problems, and it is an object of the present invention to provide a water based ink set employed for ink-jet recording which exhibits reduced feathering in text printed in black, in red and in blue, improved water resistance, lightfastness and ozone resistance, excellent color reproducibility (particularly for various colors (e.g., red, blue and orange) expressed by use of a magenta ink as a color component and for various colors (e.g., blue, green and violet) expressed by use of a cyan ink as a color component), and excellent color balance stability with age. It is also another object of the present invention to provide an ink-jet recording method effectively using such an ink set.

The present inventors have found that, by constituting a water based ink set for ink-jet recording with three primary color dye based inks (yellow, magenta and cyan inks) and pigment based inks (black, red and blue inks), color reproducibility can be improved and feathering in text printed in black, in red and in blue can be suppressed to obtain sharp text. The present inventors have also found that, by employing together the pigment based red ink for a magenta-ink-recording portion which is recorded by use of the magenta ink only or the magenta ink and the other color inks and by employing together the pigment based blue ink for a cyan-ink-recording portion which is recorded by use of the cyan ink only or the cyan ink and the other color inks, the lightfastness and the ozone resistance of those portions can be improved and the color balance deterioration caused by color fading with age can also be suppressed. Thus the present invention has been completed.

That is, the present invention provides a water based ink set for ink-jet recording having a yellow ink, a magenta ink, a cyan ink, a black ink, a red ink and a blue ink each having at least a coloring agent, water and a water soluble organic solvent. In this water based ink set, the coloring agent of each of the yellow ink, the magenta ink and the cyan ink is a water soluble dye, and the coloring agent of each of the black ink, the red ink and the blue ink is a pigment.

In addition, the present invention provides an ink-jet recording method for carrying out ink-jet recording by ejecting inks from an ink-jet head to adhere the inks to a recording material, where the inks which a water based ink set for ink-jet recording having a yellow ink containing a water soluble dye as a coloring agent, a magenta ink containing a water soluble dye as a coloring agent, a cyan ink containing a water soluble dye as a coloring agent, a black ink containing a pigment as a coloring agent, a red ink containing a pigment as a coloring agent and a blue ink containing a pigment as a coloring agent. In this method, the red ink is employed together with the magenta ink for a magenta-ink-recoding portion on a recording material and the blue ink is employed together with the cyan ink for a cyan-ink-recording portion on a recording material.

Further, when it is particularly aimed at overcoming the abovementioned drawbacks of the cyan ink, the present invention provides the following water based ink set for ink-jet recording which does not employ a red ink containing a pigment as a coloring agent and also provides an ink-jet recording method using the same.

That is, the present invention provides a water based ink set for ink-jet recording comprising a yellow ink, a magenta ink, a cyan ink, a black ink and a blue ink each comprising at least a coloring agent, water and a water soluble organic solvent. In this water based ink set, the coloring agent of each of the yellow ink, the magenta ink and the cyan ink is a water soluble dye, and the coloring agent of each of the black ink and the blue ink is a pigment.

In addition, the present invention provides an ink-jet recording method for carrying out ink-jet recording by ejecting inks from an ink-jet head to adhere the inks to a recording material, where the inks constitute a water based ink set for ink-jet recording comprising a yellow ink containing a water soluble dye as a coloring agent, a magenta ink containing a water soluble dye as a coloring agent, a cyan ink containing a water soluble dye as a coloring agent, a black ink containing a pigment as a coloring agent and a blue ink containing a pigment as a coloring agent. In this method, the blue ink is employed together with the cyan ink for a cyan-ink-recoding portion on a recording material.

Further, when it is particularly aimed at overcoming the abovementioned drawbacks of the magenta ink, the present invention provides the following ink-jet recording method using a water based ink set for ink-jet recording which does not employ a blue ink containing a pigment as a coloring agent.

That is, the present invention provides an ink-jet recording method for carrying out ink-jet recording by ejecting inks from an ink-jet head to adhere the inks to a recording material, where the inks constitute a water based ink set for ink-jet recording comprising a yellow ink containing a water soluble dye as a coloring agent, a magenta ink containing a water soluble dye asia coloring agent, a cyan ink containing a water soluble dye as a coloring agent, a black ink containing a pigment as a coloring agent and a red ink containing a pigment as a coloring agent. In this method, the red ink is employed together with the magenta ink for a magenta-ink-recoding portion on a recording material.

In the water based ink set for ink-jet recording and the ink-jet recording method according to the present invention, a dye based ink is employed for each of the three primary color inks (the yellow, magenta and cyan inks) constituting the water based ink set for ink-jet recording, and thus excellent color reproducibility is obtained in an ink-jet recorded image. In addition, the pigment based red ink and/or the pigment based blue ink is also added to the ink set employing the pigment based black ink. Thus, feathering in text printed in black and in text printed in red and/or in blue can be suppressed to obtain sharp printing. Further, when the pigment based red ink is provided, the pigment based red ink is employed together with the magenta ink for the magenta-ink-recording portion which was conventionally recorded by use of the magenta ink only or the magenta ink and the other inks. When the pigment based blue ink is provided, the pigment based blue ink is employed together with the cyan ink for the cyan-ink-recording portion which was conventionally recorded by use of the cyan ink only or the cyan ink and the other inks. Therefore, the lightfastness and the ozone resistance of those portions can be improved and the color balance deterioration caused by color fading with age can also be suppressed.

PREFERRED EMBODIMENTS OF THE INVENTION

One of the aspects of the water based ink set for ink-jet recording of the present invention comprises a yellow ink, a magenta ink and a cyan ink each containing a water soluble dye as a coloring agent, and a black ink, a red ink and a blue ink each containing a pigment as a coloring agent.

Another aspect of the water based ink set for ink-jet recording of the present invention comprises a yellow ink, a magenta ink and a cyan ink each containing a water soluble dye as a coloring agent, and a black ink and a blue ink each containing a pigment as a coloring agent.

In a certain aspect of the ink-jet recording method as described later, used is the water based ink set for ink-jet recording which comprises a yellow ink, a magenta ink and a cyan ink each containing a water soluble dye as a coloring agent, and a black ink and a red ink each containing a pigment as a coloring agent. In addition, each of the above-mentioned inks contains water and a water soluble organic solvent.

The ink-jet recording method of the present invention employs the above described water based ink sets for ink-jet recording to perform ink-jet recording by ejecting each of the inks from an ink-jet head to adhere the inks to a recording material. The red ink is employed together for a magenta-ink-recording portion on the recording material, and/or the blue ink is employed together for a cyan-ink-recording portion on the recording material.

As used herein, the term of "employed together" means that, in an example of the red ink and the magenta ink, the pigment based red ink is made to adhere to a part, to which the magenta ink is made to adhere, on a recording material such as recording paper before, after or at the same time as the adhesion of the magenta ink. Further, the dye based magenta ink and the pigment based red ink may be superposed on the recording material or may be adjacent to each other. Similarly, in an example of the blue ink and the cyan ink, the term "employed together" means that the pigment based blue ink is made to adhere to a part, to which the cyan ink is made to adhere, on a recording material such as recording paper before, after or at the same time as the adhesion of the cyan ink. Further, the dye based cyan ink and the pigment based blue ink may be superposed on the recording material or may be adjacent to each other.

In the present invention, the red color is a color having a hue angle ranging from about 5° to about 60° in the L*a*b* calorimetric system standardized by CIE (Commission Internationale de l'Eclairage), and the red ink is an ink which can express the abovementioned red color by the ink itself. The number of pigments employed in the red ink is not limited to one, and a mixture of two or more pigments may be employed provided the hue angle can be adjusted within the range of from about 5° to about 60°.

In the present invention, the blue color is a color having a hue angle ranging from about 265° to about 320° in L*a*b* calorimetric system standardized by CIE (Commission Internationale de l'Eclairage), and the blue ink is an ink which can express the abovementioned blue color by the ink itself. The number of pigments employed in the blue ink is not limited to one, and a mixture of two or more pigments may be employed provided the hue angle can be adjusted within the range of from about 265° to about 320°.

Specific examples of the pigment employed in the black ink include carbon blacks such as MA8, MA100 (available from Mitsubishi Chemical Corporation), and color black FW200 (available from Degussa). In addition, a self-dispersing type carbon black which can disperse in water without using a dispersing agent may be employed as the carbon black. The self-dispersing type pigment can be obtained by subjecting a pigment to a surface treatment such that at least one hydrophilic group such as a carbonyl group, a carboxyl group, a hydroxyl group, a sulfone group and a salt thereof is used such that the group is bonded to the surface of the pigment. Examples of the self-dispersing pigment include a pigment surface-treated by means of methods disclosed in Japanese Patent Application Laid-Open No. Hei 8-3498 (corresponding to U.S. Pat. No. 5,609,671) and in Japanese Translation of PCT international application No. 2000-513396 (corresponding to WO97/48769). In addition, a commercial product such as CAB-O-JET (a registered trade mark) 200, 300 (available from Cabot Corporation) or BONJET (a registered trade mark) CW1 (available from Orient Chemical Industries, Ltd.) may be employed as a pigment dispersion containing such a self-dispersing black pigment.

Examples of the pigment employed in the red ink as a coloring agent include C.I. pigment reds 23, 144, 170, 177, 221, 254 and 264. Among them, C.I. pigment reds 122, 177, 254 and 264 are preferred in terms of color tone and color reproducibility. Moreover, the red color may be expressed by mixing a yellow based pigment with a magenta based pigment. In this case, examples of the yellow based pigment include C.I. pigment yellows 3, 13, 74, 83 and 154, and examples of the magenta based pigment include C.I. pigment reds 5, 48, 112, 122, 202 and 207.

Examples of the pigment employed in the blue ink as a coloring agent include C.I. pigment blues 15:1, 15:3, 15:6 and 60. Among them, C.I. pigment blues 15:3 and 60 are preferred in terms of color tone and color reproducibility.

Moreover, the blue color may be expressed by mixing a magenta based pigment with the blue ink. In this case, examples of the magenta based pigment include C.I. pigment reds 5, 48, 112, 122, 202 and 207. The above examples are only preferred pigments suitable for the present invention, and the present invention is not limited thereto.

The content of the pigment contained in each of the black ink, the red ink and the blue ink depends on an intended printing density, color and the like. When the content of the pigment is too low, the color can not be satisfactorily reproduced on paper. When the content is too high, the nozzle of an ink-jet head tends to become clogged. Thus, the content of the pigment with respect to the total amount of the corresponding ink is with the range of preferably about 1 wt % to about 10 wt %, and more preferably about 1 wt % to about 7 wt %.

A pigment dispersing agent may be added to each of the black ink, the red ink and the blue ink for maintaining the dispersion stability thereof. Examples of the dispersing agent include a polymer dispersing agent and a surfactant. Examples of the polymer dispersing agent include proteins such as gelatin and albumin; natural gums such as gum arabic and tragacanth; glucosides such as saponin; cellulose derivatives such as methyl cellulose, carboxy cellulose, and hydroxy methyl cellulose; natural-occurring polymers such as lignin sulfonate and shellac; anionic polymers such as salts of polyacrylic acid, salts of styrene-acrylic acid copolymer, salts of vinylnaphthalene-acrylic acid copolymer, salts of styrene-maleic acid copolymer, salts of vinylnaphthalene-maleic acid copolymer, and a sodium salt and a phosphate of β-naphthalenesulfonic acid formalin condensate; and nonionic polymers such as polyvinyl alcohol, polyvinyl pyrrolidone and polyethylene glycol. Examples of the surfactant include anionic surfactants such as higher alcohol sulfate ester salts, liquid fatty oil sulfate ester salts and alkyl allyl sulfonates; and nonionic surfactants such as polyoxyethylene alkyl ether, polyoxyethylene alkyl ester, sorbitan alkyl ester and polyoxyethylene sorbitan alkyl ester. The above dispersing agents may be used singly or in combination of two or more thereof in accordance with need.

A suitable content of the above dispersing agents, depending on the kind of pigment and the kind of dispersing agent, is appropriately determined so as to properly function as a dispersing agent. When the content of the dispersing agent is too low, the dispersion stability of the pigment is insufficient. When the content of the dispersing agent is too high, the viscosity of the ink increases to cause difficulty in ejecting the ink from an ink-jet head. Thus, the content of the dispersing agent with respect to the amount of the pigment is within the range of preferably about 5 wt % to about 50 wt %, and more preferably about 10 wt % to about 40 wt %.

The pigment for the black ink, the red ink, or the blue ink is preferably dispersed by means of a dispersing apparatus. No particular limitation is imposed on the dispersing apparatus used for dispersing the pigment so long as it is a dispersing apparatus of the general type. Examples of the dispersing apparatus include a ball mill, a roll mill and a sand mill. Of these, a sand mill of a high speed type is preferred.

On the other hand, a water soluble dye is employed as the coloring agent for the yellow ink, the magenta ink and the cyan ink which constitute the water based ink set for ink-jet recording of the present invention. Any water soluble dye may by employed as the water soluble dye employed for the yellow ink, the magenta ink and the cyan ink, so long as it satisfies required clarity, water solubility, stability, lightfastness and other required properties. Examples of the water soluble dye include direct dyes, acid dyes, basic dyes and reactive dyes. Also, examples of the preferred dye include, when classified according to the structure of the dye, azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes and metal phthalocyanine dyes.

Specific examples of the direct dye include C.I. direct yellows 12, 24, 26, 27, 28, 33, 39, 58, 86, 98, 100, 132 and 142; C.I. direct reds 4, 17, 28, 37, 63, 75, 79, 80, 83, 99, 220, 224 and 227; C.I. direct violets 47, 48, 51, 90 and 94; and C.I. direct blues 1, 6, 8, 15, 22, 25, 71, 76, 80, 86, 90, 106, 108, 123, 163, 165, 199 and 226. Specific examples of the acid dye include C.I. acid yellows 3, 11, 17, 19, 23, 25, 29, 38, 42, 49, 59, 61, 71 and 72; C.I. acid reds 1, 6, 8, 17, 18, 32, 35, 37, 42, 51, 52, 57, 80, 85, 87, 92, 94, 115, 119, 131, 133, 134, 154, 181, 186, 249, 254, 256, 289, 315, 317 and 407; C.I. acid violets 10, 34, 49 and 75; and C.I. acid blues 9, 22, 29, 40, 59, 62, 93, 102, 104, 113, 117, 120, 167, 175, 183, 229 and 234. Specific examples of the basic dye include C.I. basic yellow 40; C.I. basic reds 1, 2, 9, 12, 13, 14 and 37; C.I. basic violets 7, 14 and 27; and C.I. basic blues 1, 3, 5, 7, 9, 24, 25, 26, 28 and 29. Specific examples of the reactive dye include C.I. reactive yellows 2, 3, 13 and 15; C.I. reactive reds 4, 23, 24, 31, 56 and 180;and C.I. reactive blues 7, 13 and 21.

When the content of the water soluble dye contained in each of the yellow ink, the magenta ink and the cyan ink is too low, the color reproducibility is unsatisfactory on a recording material. When the content is too high, a nozzle of an ink-jet head tends to become clogged. Thus, the content of the water soluble dye with respect to the total amount of the corresponding ink is within the range of preferably about 0.1 wt % to about 10 wt %, more preferably about 0.3 wt % to about 10 wt %, and particularly preferably about 0.5 wt % to about 7 wt %.

In the water based ink set for ink-jet recording of the present invention, the water employed in each of the inks (including the abovementioned black ink, the red ink and the blue ink) is not ordinary water containing ions, but is preferably deionized water. The content of the water in the ink depends on the kind and the composition of the water soluble organic solvents employed together and the desired ink properties and is determined over a wide range. When the content of water is too low, the viscosity of the ink increases to cause difficulty in ink ejection from an ink-jet head. When the content is too high, the coloring agent is precipitated or aggregated due to the evaporation of water, and thus a nozzle of an ink-jet head tends to become clogged. Therefore, the content of the water with respect to the total amount of the corresponding ink is within the range of preferably about 10 wt % to about 95 wt %, more preferably about 10 wt % to about 80 wt %, and particularly preferably about 20 wt % to about 80 wt %.

In a water based ink set for ink-jet recording of the present invention, the water soluble organic solvents employed in each of the inks are broadly categorized into a humectant and a penetrant. A water soluble organic solvent employed as the humectant is added to the ink to prevent clogging of the nozzle of an ink-jet head, and a water soluble organic solvent employed as the penetrant is added to the ink to facilitate the rapid penetration of the ink into a recording material upon printing.

Specific examples of the humectant include water soluble glycols such as glycerin, ethylene glycol, diethylene glycol, triethylene glycol, polyethylene glycol, propylene glycol, dipropylene glycol, tripropylene glycol, polypropylene glycol 1,5-pentanediol and 1,6-hexanediol. When the content of the water soluble organic solvent serving as the humectant is too low, the clogging of a nozzle of an ink-jet head is not satisfactorily prevented. When the content is too high, the viscosity of the ink increases to cause difficulty in ejection from an ink-jet head. Therefore, the content of the water soluble organic solvent serving as the humectant with respect to the total amount of the corresponding ink is within the range of preferably about 5 wt % to about 50 wt %, more preferably about 10 wt % to about 40 wt %, particularly preferably about 15 wt % to about 35 wt %.

Specific examples of the penetrant include glycol ethers typified by ethylene glycol-based and propylene glycol-based alkyl ethers. Specific examples of the ethylene glycol-based alkyl ether include ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether and triethylene glycol isobutyl ether. Specific examples of the propylene glycol-based alkyl ether include propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether and tripropylene glycol-n-butyl ether.

When the content of the water soluble organic solvent serving as the penetrant is too low, the penetrability is unsatisfactory. When the content is too high, the penetrability becomes excessively high, and thus blurring such as feathering tends to occur. Therefore, the content of the water soluble organic solvent serving as the penetrant with respect to the total amount of the corresponding ink is within the range of preferably about 1 wt % to about 10 wt %, and more preferably about 1 wt % to about 7 wt %.

Further, in addition to the humectant and the penetrant, each of the inks which constitute the water based ink set for ink-jet recording may contain still another water soluble organic solvent for other purposes such as the prevention of the ink from drying in the end portion of an ink-jet head, the improvement of the printing density and the implementation of the vivid color reproduction. Examples of such water soluble organic solvent include lower alcohols such as methyl alcohol, ethyl alcohol, n-propyl alcohol isopropyl alcohol, n-butyl alcohol, sec-butyl alcohol, and tert-butyl alcohol; amides such as dimethylformamide and dimethylacetamide; ketones and keto-alcohols such as acetone and diacetone alcohol; ethers such as tetrahydrofuran and dioxane; glycerin; pyrrolidones such as 2-pyrrolidone and N-methyl-2-pyrrolidone; and 1,3-dimethyl-2-imidazolidinone.

In the water based ink set for ink-jet recording of the present invention, the basic composition of each of the black ink, the red ink, the blue ink, the yellow ink, the magenta ink and the cyan ink is as described above. However, other conventionally known surfactants; viscosity modifiers such as polyvinyl alcohol and cellulose; surface tension modifiers; mildewproofing agents; anticorrosive agents; or the like may be added to each of the inks in accordance with need.

In the water based ink set for ink-jet recording of the present invention, each of the black ink, the red ink and the blue ink preferably has a dynamic surface tension (at a lifetime of 100 ms) of preferably 40 mN/m or more and 45 mN/m or less as measured by a maximum bubble pressure method at 25° C. In this manner, text can be printed with less feathering and improved drying characteristics on a recording material. On the other hand, when the dynamic surface tension is less than 40 mN/m, feathering tends to be noticeable. When the dynamic surface tension exceeds 45 mN/m, the drying characteristics of the ink on a recording material tends to deteriorate.

It has been known that the dynamic surface tension of a liquid such as an ink is generally determined by an oscillating jet method, a meniscus method, the maximum bubble pressure method or other method. The value of the dynamic surface tension employed in the present invention is measured by means of the maximum bubble pressure method and it can be determined by means of an automatic dynamic surface tension meter BP-D4 (available from Kyowa Interface Science Co., LTD.). In the measurement of the dynamic surface tension by means of the maximum bubble pressure method, a gas is supplied from a gas supplying source to a probe to generate gas bubbles from the end of the probe which is immersed in an ink. In this method, the generation rate of the gas bubble is changed by changing the flow rate of the gas. The pressure on the gas bubble from the ink is changed along with the gas bubble generation rate change, and the surface tension is determined based on the pressure change. The pressure reaches the maximum (the maximum bubble pressure) when the radius of the gas bubble becomes equal to the radius of the end portion of the probe. Thus, the surface tension a of the ink is represented by the following equation:

$$\sigma = (\Delta P \cdot r)/2 \quad \text{(Eq. 1)}$$

In the Eq. 1, the radius of the end portion of the probe, and $\Delta P$ is the difference between the maximum pressure and the minimum pressure on the gas bubble.

The term of "lifetime," as used herein, refers to a period of time starting from when the gas bubble is caused to be separated away from the probe to form a new surface after the pressure reaches the maximum bubble pressure to when the pressure again reaches the maximum bubble pressure.

The dynamic surface tension of each of the black ink, the red ink and the blue ink is preferably in the range described above because of the following reasons. The dynamic surface tension of a liquid such as an ink is different from the static surface tension, and is the surface tension at a lifetime of the order of several tens to several thousands of ms. Thus, the dynamic surface tension is considered to have a considerable effect on the ink penetrability into a recording material when the ink adheres thereto or is landed thereon. When the dynamic surface tension is high, the ink penetrability into the recording material is low. Therefore, the feathering is improved, but the drying characteristics of the ink on the recording material are lowered. On the other hand, when the dynamic surface tension is low, the ink penetrability into a recording material is high. Therefore, feathering becomes more noticeable, but the drying characteristics of the ink on the recording material are improved. In a general ink-jet recording method, the penetration phenomenon of an ink-jet ink into a recording material after the ink is landed on the recording material is completed in the order of several tens of ms. Therefore, in the present invention, by taking into account the errors or the like of a dynamic surface tension measurement apparatus, the value of the dynamic surface tension at a lifetime of 100 ms is employed since the measurement accuracy becomes stable thereat.

The ink-jet recording method according to the present invention performs ink-jet recording by using the water based ink set of the invention. In the ink-jet recording method of the present invention, a recording material and an ink-jet head which are used in a conventional ink-jet recording method may be appropriately employed.

When the water based ink set of the present invention is employed in the ink-jet recording method of the present invention, the dye based yellow, magenta and cyan inks are employed for a color image data. In accordance with need, the pigment based black ink is also employed for the color image data, and the pigment based red ink and/or the pigment based blue ink is also employed for the color image data. Particularly, the red ink is employed together with the magenta ink for the magenta-ink-recording portion and/or the blue ink is employed together with the cyan ink for the cyan-ink-recording portion. Conventionally, the lightfastness and the ozone resistance of the magenta-ink-recording portion and/or the cyan-ink-recording portion have been inferior to those of a yellow-ink-recording portion and a black-ink-recording portion. However, in the above manner, the lightfastness and the ozone resistance of the magenta-ink-recording portion and/or the cyan-ink-recording portion can be improved. Thus, color fading can be improved, and a color balance change with age can be suppressed.

When the used amount of the red ink in the magenta-ink-recording portion is too low, the concurrent effect of the red ink is not obtained. When the used amount is too high, a predetermined color is hard to reproduce. Thus, the used amount of the red ink is preferably about 10 vol. % or more and about 20 vol. % or less based on the adhesion amount of the magenta ink. Here, the term "magenta-ink-recording portion" refers to a part of a recording material on which a magenta ink in a certain amount is adhered to provide a variety of colors.

Similarly to the above, when the used amount of the blue ink in the cyan-ink-recording portion is too low, the concurrent effect of the blue ink is not obtained. When the used amount is too high, a predetermined color is hard to reproduce. Thus, the used amount of the blue ink is within the range of preferably about 10 vol. % or more and about 20 vol. % or less based on the adhesion amount of the cyan ink. Here, the term "cyan-ink-recording portion" refers to a part of a recording material on which a cyan ink in a certain amount is adhered to provide a variety of colors.

On the other hand, text data to be printed in black and text data to be printed in blue are reproduced by use of the pigment based black and blue inks, respectively. When the pigment based red ink is provided, text data to be printed in red is reproduced by use of the pigment based red ink.

The thus-reproduced ink-jet image exhibits excellent color reproducibility and color balance stability with age arising from lightfastness and ozone resistance. In addition, not only the text printed in black but also the text printed in red and/or in blue is sharply expressed.

EXAMPLES

The present invention will be next described in detail by way of Examples and Comparative Examples, but the present invention in not limited to these Examples. Various changes, modifications and improvements may be made based on the knowledge of a person skilled in the art, as long as they do not depart from the scope of the present invention.

(1) Ink Preparation

Inks were prepared in accordance with the compositions shown in Tables 1 and 2.

The prepared pigment based black, red and blue inks were subjected to dynamic surface tension measurement at a lifetime of 20 to 5000 ms at 25° C. by means of an automatic dynamic surface tension meter BP-D4 (available from Kyowa Interface Science Co., Ltd.), and the value of the dynamic surface tension at a lifetime of 100 ms was read. The results are shown in Tables 1 and 2.

(1-a) Black Pigment Ink 1

39 parts by weight of ion-exchanged water, 25.5 parts by weight of glycerin, 2 parts by weight of dipropylene glycol-n-propyl ether and 0.5 parts by weight of propylene glycol-n-propyl ether were mixed to prepare an ink solvent. 67 parts by weight of the ink solvent was gradually added to 33 parts by weight of CAB-C-JET (a registered trade mark) 300 (carbon black concentration: 15%, available from Cabot Corporation) under stirring. The mixture was continued to stir for 30 minutes and filtered with a membrane filter having a pore size of 1 μm to obtain the pigment based black ink 1.

The concentration of carbon black with respect to the total amount of the ink was 5 wt %.

(1-b) Black Pigment Inks 2 to 5

Black pigment inks 2 to 5 were prepared in the same manner as in the case of the black pigment ink 1, except that the respective ink compositions were changed as listed in Table 1.

(1-c) Red Pigment Ink 1

3 parts by weight of C.I. pigment red 254, 1 parts by weight of polyoxyethylene lauryl ether ammonium sulfate (average polymerization degree of oxyethylene=12), 3 parts by weight of glycerin and 13 parts by weight of ion-exchanged water were mixed. Subsequently, the mixture was subjected to dispersing processing by means of a wet sand mill using zirconia beads having a diameter of 0.3 mm as a medium to thereby obtain a red pigment dispersion.

54 parts by weight of ion-exchanged water, 24 parts by weight of glycerin and 2 parts by weight of dipropylene glycol-n-propyl ether were mixed to prepare an ink solvent. 80 parts by weight of the ink solvent was gradually added to 20 parts by weight of the red pigment dispersion under stirring. The mixture was continued to stir for 30 minutes and filtered with a membrane filter having a pore size of 1 μm to obtain the red pigment ink 1.

(1-d) Red Pigment Inks 2, 4 and 5

Red pigment inks 2, 4 and 5 were prepared in the same manner as in the case of the red pigment ink 1, except that the respective ink compositions were changed as listed in Table 1.

(1-e) Red Pigment Ink 3

15 parts by weight of C.I. pigment red 122, 5 parts by weight of polyoxyethylene lauryl ether ammonium sulfate (average polymerization degree of oxyethylene=12), 15 parts by weight of glycerin and 65 parts by weight of ion-exchanged water were mixed. Subsequently, the mixture was subjected to dispersing processing by means of a wet sand mill using zirconia beads having a diameter of 0.3 mm as a medium to thereby obtain a magenta pigment dispersion.

15 parts by weight of C.I. pigment yellow 74, 5 parts by weight of polyoxyethylene lauryl ether ammonium sulfate (average polymerization degree of oxyethylene=12), 15 parts by weight of glycerin and 65 parts by weight of ion-exchanged water were mixed. Subsequently, the mixture was subjected to dispersing processing by means of a wet sand mill using zirconia beads having a diameter of 0.3 mm as a medium to thereby obtain a yellow pigment dispersion.

23 parts by weight of the prepared magenta pigment dispersion was mixed with 10 parts by weight of the yellow pigment dispersion and stirred for 10 minutes to obtain a red pigment dispersion.

44 parts by weight of ion-exchanged water, 20.5 parts by weight of glycerin and 2.5 parts by weight of dipropylene glycol-n-propyl ether were mixed to prepare an ink solvent. 67 parts by weight of the ink solvent was gradually added to 33 parts by weight of the red pigment dispersion under stirring. The mixture was continued to stir for 30 minutes and filtered with a membrane filter having a pore size of 1 μm to obtain the red pigment ink 3.

(1-f) Blue Pigment Inks 1 to 5, Yellow Pigment Ink, Magenta Pigment Ink and Cyan Pigment Ink Blue pigment inks 1 to 5, a yellow pigment ink, a magenta pigment ink and a cyan pigment ink were prepared in the same manner as in the case of the red pigment ink 1 or 3, except that the respective ink compositions were changed as listed in Table 2.

(1-g) Black Dye Ink 68 parts by weight of ion-exchanged water, 24 parts by weight of glycerin and 5 parts by weight of dipropylene glycol-n-propyl ether were mixed to prepare an ink solvent.

3 parts by weight of food black 2 was added to 97 parts by weight of the ink solvent under stirring. The mixture was continued to stir for 30 minutes and filtered with a membrane filter having a pore size of 1 μm to prepare the black dye ink.

(1-h) Red Dye Ink, Blue Dye Ink, Yellow Dye Ink, Magenta Dye Ink and Cyan Dye Ink The above-captioned dye inks were prepared in the same manner as in the case of the black dye ink, except that the respective ink compositions were changed as listed in Table 1 or 2.

TABLE 1

| | | Black ink | | | | | | Red ink | | | | | |
|---|---|---|---|---|---|---|---|---|---|---|---|---|---|
| | | Black pigment 1 | Black pigment 2 | Black pigment 3 | Black pigment 4 | Black pigment 5 | Black dye | Red pigment 1 | Red pigment 2 | Red pigment 3 | Red pigment 4 | Red pigment 5 | Red dye |
| Ink composition (wt %) | Ion-exchanged water | 39.0 | 39.0 | 39.0 | 39.0 | 39.0 | 68.0 | 67.0 | 67.0 | 65.45 | 67.0 | 67.0 | 68.5 |
| | Glycerin | 25.5 | 26.0 | 25.0 | 23.0 | 27.0 | 24.0 | 27.0 | 27.0 | 25.45 | 24.0 | 28.0 | 24.0 |
| | Dipropylene glycol-n-propyl ether | 2.0 | 2.0 | 3.0 | 5.0 | 1.0 | 5.0 | 2.0 | 2.0 | 2.5 | 5.0 | 1.0 | 5.0 |
| | Propylene glycol-n-propyl ether | 0.5 | — | — | — | — | — | — | — | — | — | — | — |
| | Black pigment dispersion (*1) | 33.0 | 33.0 | 33.0 | 33.0 | 33.0 | — | — | — | — | — | — | — |

TABLE 1-continued

|  |  | Black ink | | | | | | Red ink | | | | | |
|---|---|---|---|---|---|---|---|---|---|---|---|---|---|
|  |  | Black pigment 1 | Black pigment 2 | Black pigment 3 | Black pigment 4 | Black pigment 5 | Black dye | Red pigment 1 | Red pigment 2 | Red pigment 3 | Red pigment 4 | Red pigment 5 | Red dye |
|  | Black dye: Food black 2 | — | — | — | — | — | 3.0 | — | — | — | — | — | — |
|  | C.I. pigment red 122 | — | — | — | — | — | — | — | — | 3.45 | — | — | — |
|  | C.I. pigment red 177 | — | — | — | — | — | — | — | 3.0 | — | — | — | — |
|  | C.I. pigment red 254 | — | — | — | — | — | — | 3.0 | — | — | — | 3.0 | — |
|  | C.I. pigment red 264 | — | — | — | — | — | — | — | — | — | 3.0 | — | — |
|  | C.I. acid red 407 | — | — | — | — | — | — | — | — | — | — | — | 2.5 |
|  | C.I. pigment yellow 74 | — | — | — | — | — | — | — | — | 1.5 | — | — | — |
|  | Polyoxyethylene lauryl ether ammonium sulfate (*2) | — | — | — | — | — | — | 1.0 | 1.0 | 1.65 | 1.0 | 1.0 | — |
| Evaluation | Dynamic surface tension (mN/m) | 42.3 | 44.0 | 40.7 | 37.4 | 48.2 | — | 42.6 | 42.8 | 40.5 | 36.2 | 47.0 | — |

(*1): CAB-O-JET 300 (registered trade mark), a product of Cabot Corporation; carbon black concentration = 15%, concentration in ink (carbon black concentration with respect to the total amount of the ink) = 5%
(*2): average polymerization degree of oxyethylene = 12

TABLE 2

|  |  | Blue ink | | | | | | Yellow ink | | Magenta ink | | Cyan ink | |
|---|---|---|---|---|---|---|---|---|---|---|---|---|---|
|  |  | Blue pigment 1 | Blue pigment 2 | Blue pigment 3 | Blue pigment 4 | Blue pigment 5 | Blue dye | Yellow dye | Yellow pigment | Magenta pigment | Magenta dye | Cyan dye | Cyan pigment |
| Ink com-position (wt %) | Ion-exchanged water | 67.0 | 67.0 | 67.0 | 67.0 | 67.0 | 68.0 | 69.0 | 67.0 | 68.5 | 66.55 | 68.1 | 67.0 |
|  | Glycerin | 26.0 | 26.0 | 25.5 | 23.0 | 27.0 | 24.0 | 24.0 | 24.0 | 24.0 | 23.05 | 24.0 | 24.0 |
|  | Dipropylene glycol-n-propyl ether | 2.0 | 2.0 | 2.5 | 5.0 | 1.0 | 5.0 | 5.0 | 5.0 | 5.0 | 5.0 | 5.0 | 5.0 |
|  | C.I. pigment blue 60 | 4.0 | — | 4.0 | 4.0 | — | — | — | — | — | — | — | — |
|  | C.I. pigment blue 15:3 | — | 2.0 | — | — | 2.0 | — | — | — | — | — | — | 3.0 |
|  | C.I. pigment red 122 | — | 2.0 | — | — | 2.0 | — | — | — | — | 4.05 | — | — |
|  | C.I. direct blue 199 | — | — | — | — | — | 1.5 | — | — | — | — | 2.9 | — |
|  | C.I. reactive red 180 | — | — | — | — | — | 1.5 | — | — | 2.5 | — | — | — |
|  | C.I. pigment yellow 74 | — | — | — | — | — | — | — | 3.0 | — | — | — | — |
|  | C.I. direct yellow 86 | — | — | — | — | — | — | 0.4 | — | — | — | — | — |
|  | C.I. direct yellow 132 | — | — | — | — | — | — | 1.6 | — | — | — | — | — |
|  | Polyoxyethylene lauryl ether ammonium sulfate (*1) | 1.0 | 1.0 | 1.0 | 1.0 | 1.0 | — | — | 1.0 | — | 1.35 | — | 1.0 |
| Evaluation | Dynamic surface tension (mN/m) | 42.4 | 42.6 | 40.3 | 36.5 | 47.2 | — | — | — | — | — | — | — |

(*1): average polymerization degree of oxyethylene = 12

(2-1) Compositions of Ink sets (Example Group RB and Comparative Example Group RB)

The water based ink sets for ink-jet recording having the ink combinations shown in Table 3 were composed by the respective inks shown in Tables 1 and 2 (Examples RB1 to RB5 and Comparative Examples RB1 to RB6).

(2-2) Evaluation (Example Group RB and Comparative Example Group RB)

The inks composing each of the ink sets were filled in a predetermined ink cartridge, and the ink cartridge was attached to a digital multifunction device equipped with an ink-jet printer (MFC-5200J, available from Brother Industries, Ltd.) to perform printing of text data to be printed in black, in red and in blue, and to also perform printing of color patch.

In this case, the black ink, the red ink, and the blue ink were employed for printing text data printed in black, in red and in blue, respectively, on plain paper (DATA COPY paper, available from m-real). However, in Comparative Examples RB1, RB2, RB4 and RB6 in which the red ink is not included in the ink set, the text was printed in red by use of the magenta ink and the yellow ink. In Comparative Examples RB1, RB2, RB3 and RB6 in which the blue ink is not included in the ink set, the text was printed in blue by use of the magenta ink and the cyan ink.

The color patches were printed on glossy paper (KASSAI (a registered trade mark) of photo finishing grade, available from Fuji Photo Film Co., Ltd.) by changing the ink mixing ratio of the yellow, magenta, cyan, red and blue inks. In this case, the magenta ink and the red ink were employed together for the magenta-ink-recording portion. The percentage of the red ink employed together with the magenta ink was 15% based on the volume of the magenta ink. Also, the cyan ink and the blue ink were employed together for the cyan-ink-recording portion. The percentage of the blue ink employed together with the cyan ink was 15% based on the volume of the cyan ink. However, in Comparative Examples RB1, RB2, RB4 and RB6 in which the red ink is not included in the ink set, the magenta ink and the red ink were not employed together. In Comparative Examples RB1, RB2, RB3 and RB6 in which the blue ink is not included in the ink set, the cyan ink and the blue ink were not employed together.

The objects in the text printed in black, in red and in blue were evaluated for (a) feathering, (b) drying characteristics on paper, (c) water resistance, and (d) lightfastness, as described hereinbelow. In addition, the printed color patches were evaluated for (e) color reproducibility, (f) lightfastness and color fading balance, and (g) ozone resistance and color fading balance, as described hereinbelow. The results are shown in Table 3.

(a) Feathering

The effects of feathering on an image were visually observed and evaluated by the following criteria.

"AA": No feathering is found.

"A": The feathering is almost unnoticeable.

"B": The feathering is noticeable. Practically problematic.

"C": The feathering is highly noticeable. Practically unsuitable.

(b) Drying Characteristics on Paper

Drying characteristics on paper are the drying characteristics of an ink on paper after printing. Printed objects were rubbed with a finger at 15 seconds after the printing. Subsequently, blurring of the ink was visually observed, and the effects of the rubbing on an image were evaluated by the following criteria.

"AA": No blurring of the ink is found.

"A": The blurring of the ink is almost unnoticeable.

"B": The blurring of the ink is noticeable. Practically problematic.

"C": The blurring of the ink is highly noticeable. Practically unsuitable.

(c) Water Resistance

The paper in which objects were printed was immersed in tap water for 5 minutes. Subsequently, the blurring of the ink on the printed paper was visually observed, and the effects of the immersion on an image were evaluated by the following criteria.

"AA": No blurring of the ink is found.

"A": The blurring of the ink is almost unnoticeable.

"B": The blurring of the ink is noticeable. Practically problematic.

"C": The blurring of the ink is highly noticeable. Practically unsuitable.

(d) Lightfastness

The evaluation was performed by means of a high energy xenon weather meter SC750-WN (available from Suga Test Instruments Co., Ltd.). The paper in which objects were printed was irradiated with light for 30 hours, and the color difference $\Delta E$ before and after the irradiation was determined.

In this evaluation test, the irradiation was performed by using a xenon lamp as a light source at a room temperature of 25° C., a humidity of 50% RH, and an irradiance of 100 W/m$^2$ (300 to 400 nm).

The color difference $\Delta E$ before and after the irradiation was measured by means of Spectrolino (light source: $D_{65}$, field of view: 2°, product of Gretag Macbeth), and the color difference $\Delta E$ in the L*a*b* calorimetric system standardized by CIE (Commission Internationale de I'Eclairage) was determined by the following equation.

$$\Delta E = \{(\Delta L^*)^2 + (\Delta a^*)^2 + (\Delta b^*)^2\}^{1/2}$$

In this equation, $\Delta L^*$=the difference in lightness before and after the irradiation, $\Delta a^*$=the difference in saturation along the red-green direction before and after the irradiation, and $\Delta b^*$=the difference in saturation along the yellow-blue direction before and after the irradiation.

Then, the lightfastness was evaluated using the magnitude of the color difference $\Delta E$ according to the following criteria.

"AA": $\Delta E$ is less than 5.

"A": $\Delta E$ is 5 or higher and less than 10.

"B": $\Delta E$ is 10 or higher and less than 20.

"C": $\Delta E$ is 20 or higher.

(e) Color Reproducibility

The color patches thus printed were visually observed, and the color reproducibility was evaluated by the following criteria.

"AA": The color reproducibility is excellent.

"A": The color reproducibility is satisfactory.

"B": The color reproducibility is slightly unsatisfactory. Practically problematic.

"C": The color reproducibility is clearly unsatisfactory. Practically unsuitable.

(f) Lightfastness and Color Fading Balance

In order to evaluate the lightfastness, the printed color patches were irradiated by use of a xenon lamp for 30 hours as in the lightfastness evaluation (d) of the printed objects in text. The color difference $\Delta E$ before and after the irradiation was determined for the solidly printed portion of each of the yellow, magenta, cyan, red, green and blue patches.

Also, the color fading balance was evaluated by use of the difference ($\Delta(\Delta E)_{max}$) between the maximum value and the minimum value of the color difference $\Delta E$ of each color as follows.

"AA": $\Delta(\Delta E)_{max}$ is less than 5.

"A": $\Delta(\Delta E)_{max}$ is 5 or higher and less than 10.

"B": $\Delta(\Delta E)_{max}$ is 10 or higher and less than 20.

"C": $\Delta(\Delta E)_{max}$ is 20 or higher.

(g) Ozone Resistance and Color Fading Balance

In order to evaluate the ozone resistance, the printed color patches were exposed to an atmosphere of an ozone concentration of 1 ppm, a chamber temperature of 24° C., and a humidity of 60% RH for 40 hours by means of an ozone resistance tester (Ozone Weather Meter OMS-H, available from Suga Test Instruments Co., Ltd.). The color difference $\Delta E$ before and after the exposure was determined for each of the yellow, magenta, cyan, red, green and blue patches as in the lightfastness evaluation (d).

Also, the color fading balance was evaluated by use of the difference ($\Delta(\Delta E)_{max}$) between the maximum value and the minimum value of the color difference $\Delta E$ of each color as follows.

"AA": $\Delta(\Delta E)_{max}$ is less than 5.

"A": $\Delta(\Delta E)_{max}$ is 5 or higher and less than 10.

"B": $\Delta(\Delta E)_{max}$ is 10 or higher and less than 20.

"C": $\Delta(\Delta E)_{max}$ is 20 or higher.

TABLE 3

(1) Ink composition

|  |  | Example RB1 | Example RB2 | Example RB3 | Example RB4 | Example RB5 | Comp. Example RB1 | Comp. Example RB2 | Comp. Example RB3 | Comp. Example RB4 | Comp. Example RB5 | Comp. Example RB6 |
|---|---|---|---|---|---|---|---|---|---|---|---|---|
| Ink set | Black ink | Black pigment 1 | Black pigment 2 | Black pigment 3 | Black pigment 4 | Black pigment 5 | Black dye | Black pigment 4 | Black pigment 4 | Black dye | Black pigment 4 | Black pigment 4 |
|  | Red ink | Red pigment 1 | Red pigment 2 | Red pigment 3 | Red pigment 4 | Red pigment 5 | — | — | Red pigment 2 | — | Red dye | — |
|  | Blue ink | Blue pigment 1 | Blue pigment 2 | Blue pigment 3 | Blue pigment 4 | Blue pigment 5 | — | — | — | Blue pigment 2 | Blue dye | — |
|  | Yellow ink | Yellow dye | Yellow dye | Yellow dye | Yellow dye | Yellow dye | Yellow dye | Yellow dye | Yellow dye | Yellow dye | Yellow pigment | Yellow pigment |
|  | Magenta ink | Magenta dye | Magenta dye | Magenta dye | Magenta dye | Magenta dye | Magenta dye | Magenta dye | Magenta dye | Magenta dye | Magenta pigment | Magenta pigment |
|  | Cyan ink | Cyan dye | Cyan dye | Cyan dye | Cyan dye | Cyan dye | Cyan dye | Cyan dye | Cyan dye | Cyan dye | Cyan pigment | Cyan pigment |

TABLE 3

(2) Evaluation results

|  |  |  |  | Example RB1 | Example RB2 | Example RB3 | Example RB4 | Example RB5 | Comp. Example RB1 |
|---|---|---|---|---|---|---|---|---|---|
| Evaluation | Text (plain paper) | Feathering | Black | AA | AA | AA | A | AA | C |
|  |  |  | Red | AA | AA | AA | A | AA | C |
|  |  |  | Blue | AA | AA | AA | A | AA | C |
|  |  | Drying characteristics on paper | Black | AA | AA | AA | AA | A | AA |
|  |  |  | Red | AA | AA | AA | AA | A | AA |
|  |  |  | Blue | AA | AA | AA | AA | A | AA |
|  |  | Water resistance | Black | AA | AA | AA | AA | AA | C |
|  |  |  | Red | AA | AA | AA | AA | AA | C |
|  |  |  | Blue | AA | AA | AA | AA | AA | C |
|  |  | Lightfastness (*1) | Black | AA ($\Delta E = 2$) | AA ($\Delta E = 2$) | AA ($\Delta E = 2$) | AA ($\Delta E = 2$) | AA ($\Delta E = 2$) | A ($\Delta E = 6$) |
|  |  |  | Red | AA ($\Delta E = 4$) | A ($\Delta E = 6$) | AA ($\Delta E = 4$) | A ($\Delta E = 7$) | AA ($\Delta E = 4$) | C ($\Delta E = 24$) |
|  |  |  | Blue | AA ($\Delta E = 4$) | A ($\Delta E = 5$) | AA ($\Delta E = 4$) | AA ($\Delta E = 4$) | A ($\Delta E = 5$) | B ($\Delta E = 15$) |
| Color patch (glossy paper) | Color reproducibility |  |  | AA | AA | AA | AA | AA | AA |
|  | Lightfastness $\Delta E$ and color fading balance $\Delta(\Delta E)_{max}$ | Yellow | | 4 | 4 | 4 | 4 | 4 | 4 |
|  |  | Magenta (*2) | | 6 | 7 | 7 | 7 | 6 | 16 |
|  |  | Cyan (*3) | | 2 | 3 | 2 | 2 | 3 | 4 |
|  |  | Red | | 4 | 5 | 4 | 5 | 4 | 18 |
|  |  | Green (*3) | | 4 | 4 | 4 | 4 | 4 | 6 |
|  |  | Blue | | 2 | 3 | 2 | 2 | 3 | 14 |
|  |  | $\Delta(\Delta E)_{max}$ (4*) | | 4 | 4 | 5 | 5 | 4 | 14 |
|  |  |  |  | AA | AA | A | A | AA | B |
|  | Ozone resistance $\Delta E$ and color fading balance $\Delta(\Delta E)_{max}$ | Yellow | | 6 | 6 | 6 | 6 | 6 | 6 |
|  |  | Magenta (*2) | | 8 | 9 | 9 | 8 | 8 | 13 |
|  |  | Cyan (*3) | | 9 | 11 | 9 | 9 | 11 | 27 |
|  |  | Red | | 5 | 5 | 6 | 6 | 5 | 10 |
|  |  | Green (*3) | | 7 | 8 | 7 | 7 | 8 | 15 |
|  |  | Blue | | 5 | 6 | 5 | 5 | 6 | 25 |
|  |  | $\Delta(\Delta E)_{max}$ (*4) | | 4 | 6 | 4 | 4 | 6 | 21 |
|  |  |  |  | AA | A | AA | AA | A | C |

|  |  |  |  | Comp. Example RB2 | Comp. Example RB3 | Comp. Example RB4 | Comp. Example RB5 | Comp. Example RB6 |
|---|---|---|---|---|---|---|---|---|
| Evaluation | Text (plain paper) | Feathering | Black | A | A | C | A | A |
|  |  |  | Red | C | AA | C | C | B |
|  |  |  | Blue | C | C | AA | C | B |
|  |  | Drying characteristics on paper | Black | AA | AA | AA | AA | AA |
|  |  |  | Red | AA | AA | AA | AA | AA |
|  |  |  | Blue | AA | AA | AA | AA | AA |
|  |  | Water resistance | Black | AA | AA | C | AA | AA |
|  |  |  | Red | C | AA | C | C | AA |
|  |  |  | Blue | C | C | AA | C | AA |
|  |  | Lightfastness (*1) | Black | AA ($\Delta E = 2$) | AA ($\Delta E = 2$) | A ($\Delta E = 6$) | AA ($\Delta E = 2$) | AA ($\Delta E = 2$) |
|  |  |  | Red | C | A | A | B | A |

TABLE 3-continued (2) Evaluation results

| Color patch (glossy paper) | | | ($\Delta E$ = 24) B ($\Delta E$ = 15) AA | ($\Delta E$ = 6) B ($\Delta E$ = 12) AA | ($\Delta E$ = 6) A ($\Delta E$ = 5) AA | ($\Delta E$ = 18) B ($\Delta E$ = 15) AA | ($\Delta E$ = 5) A ($\Delta E$ = 5) C |
|---|---|---|---|---|---|---|---|
| | Color reproducibility | Blue | | | | | |
| | Lightfastness | Yellow | 4 | 4 | 4 | 4 | 2 |
| | $\Delta E$ | Magenta (*2) | 16 | 7 | 16 | 17 | 5 |
| | and color | Cyan (*3) | 4 | 4 | 2 | 5 | 3 |
| | fading | Red | 18 | 5 | 18 | 19 | 5 |
| | balance | Green (*3) | 6 | 6 | 4 | 7 | 3 |
| | $\Delta(\Delta E)_{max}$ | Blue | 14 | 11 | 3 | 15 | 5 |
| | | $\Delta(\Delta E)_{max}$ (4*) | 14 | 7 | 16 | 15 | 3 |
| | | | B | B | B | B | AA |
| | Ozone | Yellow | 6 | 6 | 6 | 6 | 3 |
| | resistance | Magenta (*2) | 13 | 9 | 13 | 14 | 6 |
| | $\Delta E$ and | Cyan (*3) | 27 | 27 | 11 | 27 | 6 |
| | color | Red | 10 | 5 | 10 | 12 | 7 |
| | fading | Green (*3) | 15 | 15 | 8 | 17 | 5 |
| | balance | Blue | 25 | 22 | 6 | 27 | 7 |
| | $\Delta(\Delta E)_{max}$ | $\Delta(\Delta E)_{max}$ (*4) | 21 | 21 | 7 | 21 | 4 |
| | | | C | C | A | C | AA |

(*1): $\Delta E$ = the color difference before and after the irradiation.
(*2): The magenta ink and the red ink are employed together (Examples RB1 to RB5, Comparative Examples RB3 and RB5).
(*3): The cyan ink and the blue ink are employed together (Examples RB1 to RB5, Comparative Examples RB4 and RB5).
(*4): $\Delta(\Delta E)$max = the difference between the maximum value and the minimum value of the color difference $\Delta E$ of each color.

As can be seen from the list and the results in Table 3, in Examples RB1 to RB5, each of the ink sets comprises the pigment based black, red and blue inks, and the dye based yellow, magenta and cyan inks. Thus, the printed objects in text were excellent in all the properties including (a) feathering, (b) drying characteristics on paper, (c) water resistance and (d) lightfastness. Also, the printed color patches were excellent in all the properties including (e) color reproducibility, (f) lightfastness and color fading balance, and (g) ozone resistance and color fading balance.

In particular, the pigment based black, red and blue inks of Examples RB1 to RB3 each have a dynamic surface tension (at a lifetime of 100 ms and at a temperature of 25° C.) of 40 mN/m or more and 45 mN/m or less. Therefore, both the feathering and the drying characteristics on paper were better than those of the other Examples.

On the other hand, in Comparative Examples RB1 to RB6 text data was printed using the dye based inks rather than the pigment based inks. Therefore, the feathering, the water resistance and the lightfastness were inferior to those of Examples.

In particular, in Comparative Examples RB1, RB2 and RB4 in which the red ink is not included in the ink set, the red color in text was expressed by use of the magenta dye ink and the yellow dye ink. Therefore, feathering occurred due to the use of the dye based inks and due to an increase of the ink amount caused by the use of the two inks. In addition to this, ink misplacement occurred due to a landing error. Thus, the sharpness of the text printed in red was significantly deteriorated. Further, in Comparative Examples RB1, RB2, RB4 and RB5 in which the red pigment ink is not included in the ink set, the lightfastness ($\Delta E$) of the magenta and red color patches was significantly deteriorated.

In Comparative Examples RB1 to RB3 in which the blue ink is not included in the ink set, the blue color in text was expressed by use of the magenta dye ink and the cyan dye ink. Therefore, feathering occurred due to the use of the dye based inks and due to an increase of the ink amount caused by the use of the two inks. In addition to this, ink misplacement occurred due to a landing error. Thus, the sharpness of the text printed in blue was significantly deteriorated. Incidentally, in Comparative Example RB3, the lightfastness of the text printed in blue is slightly improved as compared to those of Comparative Examples RB1 and RB2. This is because the blue color in text was expressed by the color mixing of the magenta dye ink and the cyan dye ink in Comparative Examples RB1 and RB2, but the red pigment ink 2 was employed together with the magenta dye ink and the cyan dye ink to express the blue color in text in Comparative Example 3.

Moreover, in Comparative Examples RB1, RB2, RB3 and RB5 in which the blue pigment ink is not included in the ink set, the ozone resistance ($\Delta E$) of the cyan and blue color patches was significantly deteriorated.

Further, in Comparative Example RB6 in which all the inks composing the ink set are pigment based inks, the red color in text was expressed by use of the magenta pigment ink and the yellow pigment ink, and the blue color in text was expressed by use of the magenta pigment ink and the cyan pigment ink. Thus, feathering due to an increase of the ink amount caused by the use of the two inks was found in the printed text. In addition, ink misplacement caused by the landing error of the two inks was also found in the printed text. Moreover, the color reproducibility of the color patches was distinctly deteriorated as compared to those in Examples.

The water based ink set for ink-jet recording and the ink-jet recording method of the present invention, which are supported by the above described Examples RB1 to RB5, are useful when a color image and text to be printed in black, in red or in blue are printed in an ink-jet recording system.

(3-1) Compositions of Ink Sets (Example Group B and Comparative Example Group B)

The water based ink sets for ink-jet recording having the ink combinations shown in Table 4 were composed by the respective inks shown in Tables 1 and 2 (Examples B1 to B5 and Comparative Examples B1 to B5).

(3-2) Evaluation (Example Group B and Comparative Example Group B)

The inks composing each of the ink sets were filled in a predetermined cartridge, and the cartridge was attached to a digital multifunction device equipped with an ink-jet printer (MFC-5200J, available from Brother Industries, Ltd.) to perform printing of text data to be printed in black and in blue, and to also perform printing of color patch.

In this case, the black ink and the blue ink were employed for printing text data printed in black and in blue, respectively, on plain paper (DATA COPY paper, available from m-real). However, in Comparative Examples B1, B2 and B5 (the blue ink is not included in the ink set), the text was printed in blue by use of the magenta ink and the cyan ink.

The color patches were printed on glossy paper (KASSAI (a registered trade mark) of photo finishing grade, available from Fuji Photo Film Co., Ltd.) by changing the ink mixing ratio of the yellow, magenta, cyan and blue inks. The reason for using the glossy paper in this printing is that Color change of the printed objects on the glossy payer due to the exposure to ozone can be observed more remarkably than on plain paper, and accordingly the glossy paper is suitable for the ozone resistance evaluation. Incidentally, in this case the cyan ink and the blue ink were employed together for the cyan-ink-recording portion. The percentage of the blue ink employed together with the cyan ink for the cyan-ink-recording portion was 15% based on the volume of the cyan ink. However, in Comparative Examples B1, B2 and B5 (the blue ink is not included in the ink set), the cyan ink and the blue ink were not employed together.

The objects in the text printed in black and in blue were evaluated for (a) feathering, (b) drying characteristics on paper, (c) water resistance and (d) lightfastness, and the printed color patches were evaluated for (e) color reproducibility, and (g) ozone resistance and color fading balance. They were evaluated in the same manner as in the evaluation for Example Group RB and Comparative Example Group RB described above. The results are shown in Table 4.

TABLE 4

| | | | | Example B1 | Example B2 | Example B3 | Example B4 | Example B5 |
|---|---|---|---|---|---|---|---|---|
| Ink set | | Black ink | | Black pigment 1 | Black pigment 2 | Black pigment 3 | Black pigment 4 | Black pigment 5 |
| | | Blue ink | | Blue pigment 1 | Blue pigment 2 | Blue pigment 3 | Blue pigment 4 | Blue pigment 5 |
| | | Yellow ink | | Yellow dye | Yellow dye | Yellow dye | Yellow dye | Yellow dye |
| | | Magenta ink | | Magenta dye | Magenta dye | Magenta dye | Magenta dye | Magenta dye |
| | | Cyan ink | | Cyan dye | Cyan dye | Cyan dye | Cyan dye | Cyan dye |
| Evaluation | Text (plain paper) | Feathering | Black | AA | AA | AA | A | AA |
| | | | Blue | AA | AA | AA | A | AA |
| | | Drying characteristics on paper | Black | AA | AA | AA | AA | A |
| | | | Blue | AA | AA | AA | AA | A |
| | | Water resistance | Black | AA | AA | AA | AA | AA |
| | | | Blue | AA | AA | AA | AA | AA |
| | | Lightfastness (*1) | Black | AA ($\Delta E = 2$) | AA ($\Delta E = 2$) | AA ($\Delta E = 2$) | AA ($\Delta E = 2$) | AA ($\Delta E = 2$) |
| | | | Blue | AA ($\Delta E = 4$) | A ($\Delta E = 5$) | AA ($\Delta E = 4$) | AA ($\Delta E = 4$) | A ($\Delta E = 5$) |
| | Color patch (glossy paper) | Color reproducibility | | AA | AA | AA | AA | AA |
| | | Ozone resistance $\Delta E$ and color fading balance $\Delta(\Delta E)_{max}$ | Yellow | 6 | 6 | 6 | 6 | 6 |
| | | | Magenta | 13 | 13 | 13 | 13 | 13 |
| | | | Cyan (*2) | 9 | 11 | 9 | 9 | 11 |
| | | | Red | 10 | 10 | 10 | 10 | 10 |
| | | | Green (*2) | 7 | 8 | 7 | 7 | 8 |
| | | | Blue | 5 | 6 | 5 | 5 | 6 |
| | | | $\Delta(\Delta E)_{max}$ (*3) | 8 | 7 | 8 | 8 | 7 |
| | | | | A | A | A | A | A |

| | | | | Comp. Example B1 | Comp. Example B2 | Comp. Example B3 | Comp. Example B4 | Comp. Example B5 |
|---|---|---|---|---|---|---|---|---|
| Ink set | | Black ink | | Black dye | Black pigment 4 | Black pigment 4 | Black dye | Black pigment 4 |
| | | Blue ink | | — | — | Blue dye | Blue pigment 2 | — |
| | | Yellow ink | | Yellow dye | Yellow dye | Yellow dye | Yellow dye | Yellow pigment |
| | | Magenta ink | | Magenta dye | Magenta dye | Magenta dye | Magenta dye | Magenta pigment |
| | | Cyan ink | | Cyan dye | Cyan dye | Cyan dye | Cyan dye | Cyan pigment |
| Evaluation | Text (plain paper) | Feathering | Black | C | A | A | C | A |
| | | | Blue | C | C | C | AA | B |
| | | Drying characteristics on paper | Black | AA | AA | AA | AA | AA |
| | | | Blue | AA | AA | AA | AA | AA |
| | | Water resistance | Black | C | AA | AA | C | AA |
| | | | Blue | C | C | C | AA | AA |
| | | Lightfastness (*1) | Black | A ($\Delta E = 6$) | AA ($\Delta E = 2$) | AA ($\Delta E = 2$) | A ($\Delta E = 6$) | AA ($\Delta E = 2$) |
| | | | Blue | B | B | B | A | A |

TABLE 4-continued

|  |  |  | ($\Delta E = 15$) | ($\Delta E = 15$) | ($\Delta E = 15$) | ($\Delta E = 5$) | ($\Delta E = 5$) |
|---|---|---|---|---|---|---|---|
| Color | Color reproducibility |  | AA | AA | AA | AA | C |
| patch | Ozone | Yellow | 6 | 6 | 6 | 6 | 3 |
| (glossy | resistance | Magenta | 13 | 13 | 13 | 13 | 6 |
| paper) | $\Delta E$ and | Cyan (*2) | 27 | 27 | 27 | 11 | 6 |
|  | color | Red | 10 | 10 | 10 | 10 | 7 |
|  | fading | Green (*2) | 15 | 15 | 17 | 8 | 5 |
|  | balance | Blue | 25 | 25 | 27 | 6 | 7 |
|  | $\Delta(\Delta E)_{max}$ | $\Delta(\Delta E)_{max}$ (*3) | 21 | 21 | 21 | 7 | 4 |
|  |  |  | C | C | C | A | A |

(*1): $\Delta E$ = the color difference before and after the irradiation.
(*2): The cyan ink and the blue ink are employed together (Examples B1 to B5, Comparative Examples B3 and B4).
(*3): $\Delta(\Delta E)_{max}$ = the difference between the maximum value and the minimum value of the color difference $\Delta E$ of each color.

As can be seen from the list and the results in Table 4, in Examples B1 to B5, each of the ink sets comprises the pigment based black and blue inks, and the dye based yellow, magenta and cyan inks. Thus, the printed objects in text were excellent in all the properties including (a) feathering, (b) drying characteristics on paper, (c) water resistance and (d) lightfastness. Also, the printed color patches were excellent in all the properties including (e) color reproducibility, and (g) ozone resistance and color fading balance.

In particular, the pigment based black and blue inks of Examples B1 to B3 each have a dynamic surface tension (at a lifetime of 100 ms and at a temperature of 25° C.) of 40 mN/m or more and 45 mN/m or less. Therefore, both the feathering and the drying characteristics on paper were better than those of the other Examples.

On the other hand, in Comparative Examples B1 to B4, the text was not printed by use of the pigment based inks but was printed by use of the dye based inks. Thus, the feathering, the water resistance and the lightfastness were deteriorated. Particularly, in Comparative Examples B1 and B2 in which neither the blue pigment ink nor the blue dye ink is included in the ink set, the blue color in the text was expressed by use of the magenta dye ink and the cyan dye ink. Therefore, feathering occurred due to the use of the dye based inks and due to an increase of the ink amount caused by the use of the two inks. In addition, ink misplacement occurred due to a landing error. Thus, the sharpness of the text printed in blue was significantly deteriorated. In Comparative Examples B1 to B3 in which the blue pigment ink is not included, the ozone resistance ($\Delta E$) of the cyan and blue color patches was significantly deteriorated.

In Comparative Example B5 in which all the inks composing the ink set are pigment based inks, the blue color in text was expressed by use of the magenta pigment ink and the cyan pigment ink. Thus, feathering due to an increase of the ink amount caused by the use of the two inks was found, and ink misplacement caused by the landing error of the two inks was also found. Moreover, the color reproducibility of the color patches was distinctly deteriorated as compared to those in the Examples.

The water based ink set for ink-jet recording and the ink-jet recording method of the present invention, which are supported by the above described Examples B1 to B5, are useful when a color image and text to be printed in black or in blue are printed in an ink-jet recording system.

(4-1) Compositions of Ink Sets (Example Group R and Comparative Example Group R)

The water based ink sets for ink-jet recording having the ink combinations shown in Table 5 were composed by the respective inks shown in Tables 1 and 2 (Examples R1 to R5 and Comparative Examples R1 to R5).

(4-2) Evaluation (Example Group R and Comparative Example Group R)

The inks composing each of the ink sets were filled in a predetermined cartridge, and the cartridge was attached to a digital multifunction device equipped with an ink-jet printer (MFC-5200J, available from Brother Industries, Ltd.) to perform printing of text data to be printed in black and in red, and to also perform printing of color patch.

In this case, the black ink and the red ink were employed for printing text data printed in black and in red, respectively, on plain paper (DATA COPY paper, available from m-real). However, in Comparative Examples R1, R2 and R5 (the red ink is not included in the ink set), the text was printed in red by use of the yellow ink and the magenta ink.

The color patches were printed on plain paper (DATA COPY paper, available from m-real) by changing the ink mixing ratio of the yellow, magenta, cyan and red inks. The reason for using the plain paper in this printing is that color change of the printed objects on the plain payer due to the exposure to light can be observed more remarkably than on glossy paper, and accordingly the plain paper is suitable for the lightfastness evaluation. Incidentally, in this case the red ink and the magenta ink were employed together for the magenta-ink-recording portion. The percentage of the red ink employed together with the magenta ink for the magenta-ink-recording portion was 15% based on the volume of the magenta ink. However, in Comparative Examples R1, R2 and R5 (the red ink is not included in the ink set), the red ink and the magenta ink were not employed.

The objects in the text printed in black and in red were evaluated for (a) feathering, (b) drying characteristics on paper, (c) water resistance and (d) lightfastness, and the printed color patches were evaluated for (e) color reproducibility, and (d) lightfastness and color fading balance. They were evaluated in the same manner as in the evaluation for Example Group RB and Comparative Example Group RB described above. The results are shown in Table 5.

TABLE 5

|  |  |  | Example R1 | Example R2 | Example R3 | Example R4 | Example R5 |
|---|---|---|---|---|---|---|---|
| Ink set | Black ink | | Black pigment 1 | Black pigment 2 | Black pigment 3 | Black pigment 4 | Black pigment 5 |
| | Red ink | | Red pigment 1 | Red pigment 2 | Red pigment 3 | Red pigment 4 | Red pigment 5 |
| | Yellow ink | | Yellow dye | Yellow dye | Yellow dye | Yellow dye | Yellow dye |
| | Magenta ink | | Magenta dye | Magenta dye | Magenta dye | Magenta dye | Magenta dye |
| | Cyan ink | | Cyan dye | Cyan dye | Cyan dye | Cyan dye | Cyan dye |
| Evaluation Text (plain paper) | Feathering | Black | AA | AA | AA | A | AA |
| | | Red | AA | AA | AA | A | AA |
| | Drying characteristics on paper | Black | AA | AA | AA | AA | A |
| | | Red | AA | AA | AA | AA | A |
| | Water resistance | Black | AA | AA | AA | AA | AA |
| | | Red | AA | AA | AA | AA | AA |
| | Lightfastness (*1) | Black | AA ($\Delta E = 2$) | AA ($\Delta E = 2$) | AA ($\Delta E = 2$) | AA ($\Delta E = 2$) | AA ($\Delta E = 2$) |
| | | Red | AA ($\Delta E = 4$) | A ($\Delta E = 6$) | AA ($\Delta E = 4$) | A ($\Delta E = 7$) | AA ($\Delta E = 4$) |
| Color patch (plain paper) | Color reproducibility | | AA | AA | AA | AA | AA |
| | Lightfastness $\Delta E$ and color fading balance $\Delta(\Delta E)_{max}$ | Yellow | 7 | 7 | 7 | 7 | 7 |
| | | Magenta (*3) | 7 | 9 | 7 | 12 | 7 |
| | | Cyan | 4 | 4 | 4 | 4 | 4 |
| | | Red | 4 | 6 | 4 | 7 | 4 |
| | | Green (*3) | 5 | 5 | 5 | 5 | 5 |
| | | Blue (*3) | 8 | 9 | 8 | 11 | 8 |
| | | $\Delta(\Delta E)_{max}$ (*2) | 4 | 5 | 4 | 8 | 4 |
| | | | AA | A | AA | A | AA |

|  |  |  | Comp. Example R1 | Comp. Example R2 | Comp. Example R3 | Comp. Example R4 | Comp. Example R5 |
|---|---|---|---|---|---|---|---|
| Ink set | Black ink | | Black dye | Black pigment 4 | Black pigment 4 | Black dye | Black pigment 4 |
| | Red ink | | — | — | Red dye | Red pigment 2 | — |
| | Yellow ink | | Yellow dye | Yellow dye | Yellow dye | Yellow dye | Yellow pigment |
| | Magenta ink | | Magenta dye | Magenta dye | Magenta dye | Magenta dye | Magenta pigment |
| | Cyan ink | | Cyan dye | Cyan dye | Cyan dye | Cyan dye | Cyan pigment |
| Evaluation Text (plain paper) | Feathering | Black | C | A | A | C | A |
| | | Red | C | C | C | AA | B |
| | Drying characteristics on paper | Black | AA | AA | AA | AA | AA |
| | | Red | AA | AA | AA | AA | AA |
| | Water resistance | Black | C | AA | AA | C | AA |
| | | Red | C | C | C | AA | AA |
| | Lightfastness (*1) | Black | A ($\Delta E = 6$) | AA ($\Delta E = 2$) | AA ($\Delta E = 2$) | A ($\Delta E = 6$) | AA ($\Delta E = 2$) |
| | | Red | C ($\Delta E = 24$) | C ($\Delta E = 24$) | B ($\Delta E = 18$) | A ($\Delta E = 6$) | A ($\Delta E = 5$) |
| Color patch (plain paper) | Color reproducibility | | AA | AA | AA | AA | C |
| | Lightfastness $\Delta E$ and color fading balance $\Delta(\Delta E)_{max}$ | Yellow | 7 | 7 | 7 | 7 | 3 |
| | | Magenta (*3) | 17 | 17 | 17 | 9 | 6 |
| | | Cyan | 4 | 4 | 4 | 4 | 3 |
| | | Red | 24 | 24 | 18 | 6 | 5 |
| | | Green (*3) | 5 | 5 | 5 | 5 | 3 |
| | | Blue (*3) | 15 | 15 | 16 | 9 | 7 |
| | | $\Delta(\Delta E)_{max}$ (*2) | 20 | 20 | 14 | 5 | 4 |
| | | | C | C | B | A | AA |

(*1): Lightfastness $\Delta E$ = the color difference before and after the evaluation test.
(*2): $\Delta(\Delta E)_{max}$ = the difference between the maximum value and the minimum value of the color difference $\Delta E$ of each color.
(*3): The magenta ink and the red ink are employed together (Examples R1 to R5, Comparative Examples R3 and R4).

In the ink-jet recording method of Examples R1 to R5, the water based ink sets each comprise the pigment based black and red inks, and the dye based yellow, magenta and cyan inks. Furthermore, the red pigment ink which exhibits excellent lightfastness is employed together for the magenta-ink-recording portion. Thus, the feathering, the drying characteristics on paper, the water resistance and the lightfastness of the black color and the red color were excellent. In addition, the color reproducibility and the color fading balance after the lightfastness evaluation test were also excellent.

The pigment based black and red inks of Examples R1 to R3 each have a dynamic surface tension (at a lifetime of 100 ms and at a temperature of 25° C.) of 40 mN/m or more and 45 mN/m or less. Therefore, both the feathering and the drying characteristics on paper were better than those of the other Examples.

On the contrary to Examples, the water based ink sets for ink-jet recording employed in Comparative Examples R1 to R3 do not employ the red ink, or employ the dye based red ink when the red ink is employed. Therefore, the feathering, the water resistance and the color fading balance after the lightfastness evaluation test were not excellent.

Since the black dye ink is employed as the black ink in Comparative Example R4, the feathering and the water resistance of the black color were not excellent. Since all of the inks are pigment inks in Comparative Example R5, the feathering of the black color, the water resistance, lightfastness of the black color and the red color and the color fading balance for each color after the lightfastness evaluation test were excellent, but the color reproducibility was distinctly worse than those of the Examples. Further, since the red pigment ink is not contained in the ink set, the text printed in red was expressed by use of the pigment based yellow ink and the pigment based magenta ink. Therefore, feathering was found due to a landing error of the yellow ink and the magenta ink.

In the ink-jet recording method of the present invention supported by Examples R1 to R5 described above, dye based inks prepared by dissolving a water soluble dye serving as the coloring agent in water and a water soluble organic solvent are employed as the yellow, magenta and cyan inks composing the water based ink set. Thus, excellent color reproducibility of an ink-jet recording image can be obtained. In addition, since the black and red inks each containing a pigment as the coloring agent are added to the ink set, sharp edges can be obtained in text printed in black and in red. Further, since the pigment based red ink is employed together for the magenta-ink-recording portion to be recorded by use of the magenta ink only or the magenta ink and the other color inks, the lightfastness of the portion can be improved, and the color balance deterioration caused by color fading with age can be suppressed.

The entire disclosures of the specifications, claims and summaries of Japanese Patent Application Nos. 2004-305451, 2005-096499 and 2005-096567 filed on Oct. 20, 2004, Mar. 29, 2005 and Mar. 29, 2005, respectively, are hereby incorporated by reference.

What is claimed is:

1. A water based ink set for ink-jet recording comprising a yellow ink, a magenta ink, a cyan ink, a black ink, a red ink and a blue ink each comprising at least a coloring agent, water and a water soluble organic solvent, wherein
the coloring agent of each of the yellow ink, the magenta ink and the cyan ink is a water soluble dye, and the coloring agent of each of the black ink, the red ink and the blue ink is a pigment.

2. The water based ink set for ink-jet recording according to claim 1, wherein
the black ink, the red ink and the blue ink each have a dynamic surface tension at a lifetime of 100 ms of 40 mN/m or more and 45 mN/m or less as measured by a maximum bubble pressure method at 25° C.

3. The water based ink set for ink-jet recording according to claim 1, wherein the red ink employs as the coloring agent at least one pigment selected from the group consisting of C.I. pigment reds 122, 177, 254 and 264.

4. The water based ink set for ink-jet recording according to claim 1, wherein
the blue ink employs as the coloring agent at least one of C.I. pigment blues 15:3 and 60.

5. The water based ink set for ink-jet recording according to claim 1, wherein
the black ink employs carbon black as the coloring agent.

6. An ink-jet recording method for carrying out ink-jet recording by ejecting inks from an ink-jet head to adhere the inks to a recording material, where the inks constitute a water based ink set for ink-jet recording comprising a yellow ink containing a water soluble dye as a coloring agent, a magenta ink containing a water soluble dye as a coloring agent, a cyan ink containing a water soluble dye as a coloring agent, a black ink containing a pigment as a coloring agent, a red ink containing a pigment as a coloring agent, and a blue ink containing a pigment as a coloring agent, wherein
the red ink is employed together with the magenta ink for a magenta-ink-recording portion on a recording material and the blue ink is employed together with the cyan ink for a cyan-ink-recording portion on a recording material.

7. The ink-jet recording method according to claim 6, wherein
an amount of the red ink adhering to the recording material in the magenta-ink-recording portion in which the red ink is employed together is 10 vol. % or more and 20 vol. % or less of the adhesion amount of the magenta ink.

8. The ink-jet recording method according to claim 6, wherein
an amount of the blue ink adhering to the recording material in the cyan-ink-recording portion in which the blue ink is employed is 10 vol. % or more and 20 vol. % or less of the adhesion amount of the cyan ink.

9. The ink-jet recording method according to claim 6, wherein
the black ink, the red ink and the blue ink each have a dynamic surface tension at a lifetime of 100 ms of 40 mN/m or more and 45 mN/m or less as determined by a maximum bubble pressure method at 25° C.

10. The ink-jet recording method according to claim 6, wherein
the red ink employs as the coloring agent at least one pigment selected from the group consisting of C.I. pigment reds 122, 177 254 and 264.

11. The ink-jet recording method according to claim 6, wherein
the blue ink employs as the coloring agent at least one of C.I. pigment blues 15:3 and 60.

12. The ink-jet recording method according to claim 6, wherein
the black ink employs carbon black as the coloring agent.

13. A water based ink set for ink-jet recording comprising a yellow ink, a magenta ink, a cyan ink, a black ink and a blue ink each comprising at least a coloring agent, water and a water soluble organic solvent, wherein
the coloring agent of each of the yellow ink, the magenta ink and the cyan ink is a water soluble dye, and the coloring agent of each of the black ink and the blue ink is a pigment.

14. The water based ink set for ink-jet recording according to claim 13, wherein the black ink and the blue ink each have a dynamic surface tension at a lifetime of 100 ms of 40 mN/m or more and 45 mN/m or less as measured by a maximum bubble pressure method at 25° C.

15. The water based ink set for ink-jet recording according to claim 13, wherein
the blue ink employs as the coloring agent at least one of C.I. pigment blues 15:3 and 60.

16. The water based ink set for ink-jet recording according to claim 13, wherein
the black ink employs carbon black as the coloring agent.

17. An ink-jet recording method for carrying out ink-jet recording by ejecting inks from an ink-jet head to adhere the inks to a recording material, where the inks constitute a water based ink set for ink-jet recording comprising a yellow ink containing a water soluble dye as a coloring agent, a magenta ink containing a water soluble dye as a coloring agent, a cyan ink containing a water soluble dye as a coloring agent, a black ink containing a pigment as a coloring agent and a blue ink containing a pigment as a coloring agent, wherein
the blue ink is employed together with the cyan ink for a cyan-ink-recording portion on a recording material.

18. The ink-jet recording method according to claim 17, wherein
an amount of the blue ink adhering to the recording material in the cyan-ink-recording portion in which the blue ink is employed together is 10 vol. % or more and 20 vol. % or less of the adhesion amount of the cyan ink.

19. The ink-jet recording method according to claim 17, wherein
the black ink and the blue ink each have a dynamic surface tension at a lifetime of 100 ms of 40 mN/m or more and 45 mN/m or less as determined by a maximum bubble pressure method at 25° C.

20. The ink-jet recording method according to claim 17, wherein
the blue ink employs as the coloring agent at least one of C.I. pigment blues 15:3 and 60.

21. The ink-jet recording method according to claim 17, wherein
the black ink employs carbon black as the coloring agent.

22. An ink-jet recording method for carrying out ink-jet recording by ejecting inks from an ink-jet head to adhere the inks to a recording material, where the inks constitute a water based ink set for ink-jet recording comprising a yellow ink containing a water soluble dye as a coloring agent, a magenta ink containing a water soluble dye as a coloring agent, a cyan ink containing a water soluble dye as a coloring agent, a black ink containing a pigment as a coloring agent and a red ink containing a pigment as a coloring agent, wherein
the red ink is employed together with the magenta ink for a magenta-ink-recording portion on a recording material.

23. The ink-jet recording method according to claim 22, wherein
an amount of the red ink adhering to the recording material in the magenta-ink-recording portion in which the red ink is employed together is 10 vol. % or more and 20 vol. % or less of the adhesion amount of the magenta ink.

24. The ink-jet recording method according to claim 22, wherein
the black ink and the red ink each have a dynamic surface tension at a lifetime of 100 ms of 40 mN/m or more and 45 mN/m or less as determined by a maximum bubble pressure method at 25° C.

25. The ink-jet recording method according to claim 22, wherein
the red ink employs as the coloring agent at least one pigment selected from the group consisting of C.I. pigment reds 122, 177, 254 and 264.

26. The ink-jet recording method according to claim 22, wherein
the black ink employs carbon black as the coloring agent.

* * * * *